United States Patent [19]

Krause

[11] 4,155,432

[45] May 22, 1979

[54] RIGID SEGMENTED BRAKE DISK

[75] Inventor: Walter J. Krause, Akron, Ohio

[73] Assignee: Goodyear Aerospace Corporation, Akron, Ohio

[21] Appl. No.: 827,291

[22] Filed: Aug. 24, 1977

[51] Int. Cl.² .................................... F16D 65/12
[52] U.S. Cl. .................... 188/218 XL; 188/251 A
[58] Field of Search ............ 188/73.1, 73.2, 218 XL, 188/250 B, 251 R, 251 A, 251 M, 261; 192/107 R

[56] References Cited

U.S. PATENT DOCUMENTS

| | | | |
|---|---|---|---|
| 2,610,719 | 9/1952 | Hornbostel | 188/218 XL X |
| 3,483,953 | 12/1969 | Bender | 188/218 XL |
| 3,698,519 | 10/1972 | Crossman | 188/73.2 |
| 3,718,210 | 2/1973 | Dernovshek et al. | 188/218 XL |
| 3,730,320 | 5/1973 | Freeder et al. | 188/218 XL X |

*Primary Examiner*—Duane A. Reger

*Attorney, Agent, or Firm*—P. E. Milliken; E. W. Oldham; D. J. Hudak

[57] ABSTRACT

A friction segmented brake disk has a plurality of arcual segments which are rigidly fastened together by a tongue extending from at least one end portion of the segment and is received by an adjacent segment recess and fastened thereto by at least two fastening members. The tongue, recess, and fastening members all reside by the periphery of each arcual segment, substantially beyond the swept area of each segment to avoid the thermal expansion and contraction forces inherent to the swept area. In another embodiment, a rigid friction brake disk contains a plurality of arcual segments which have a slot in each end portion thereof. A clip engages the slots and is connected thereto by a fastening member. Similarly, the clip, slot and fastening members will reside on the periphery of each arcual segment, substantially beyond or outside the swept area of each segment, and thereby also minimizes thermal expansion and contraction forces inherent to the swept area.

31 Claims, 7 Drawing Figures

U.S. Patent     May 22, 1979     4,155,432
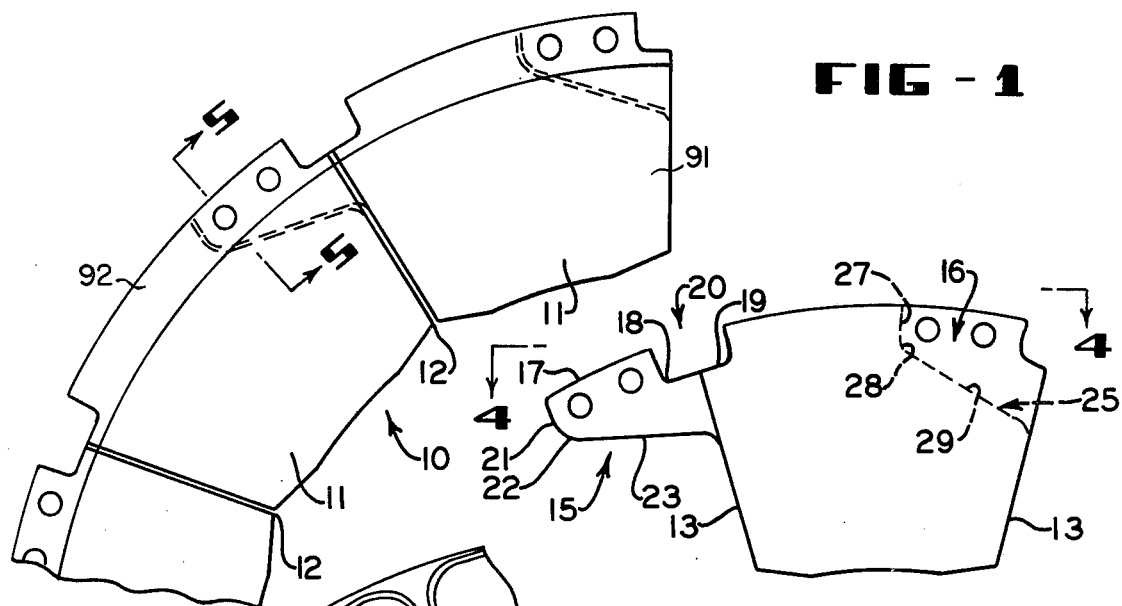
FIG-1
FIG-2
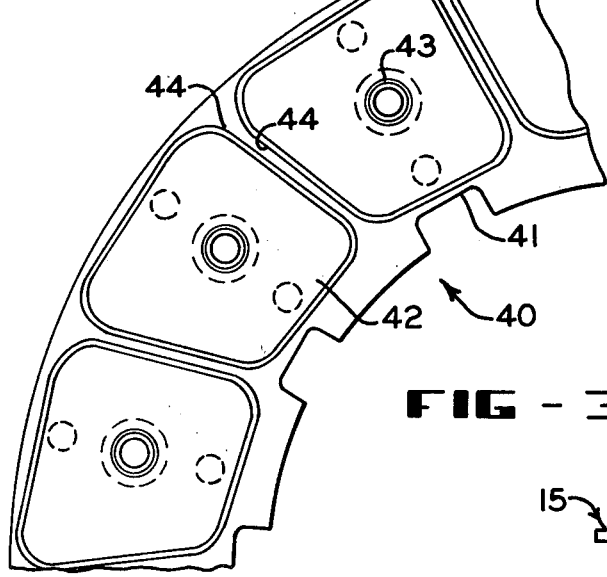
FIG-3
FIG-5
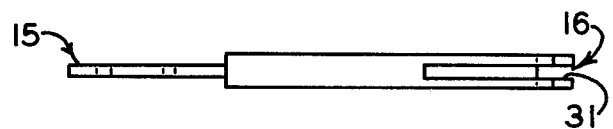
FIG-4
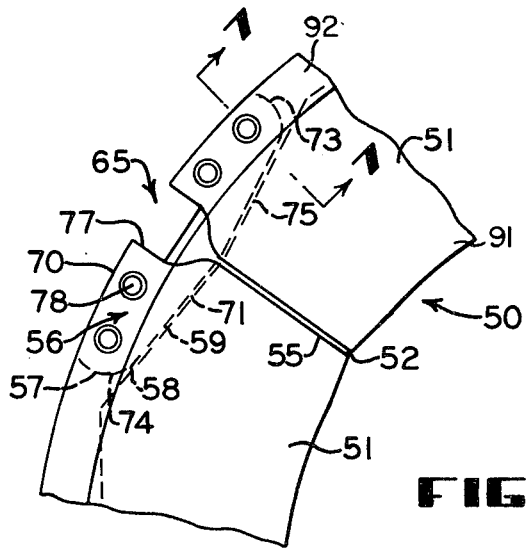
FIG-6
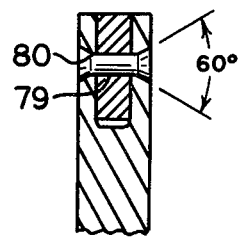
FIG-7

RIGID SEGMENTED BRAKE DISK

CROSS-REFERENCE

This application is a continuation-in-part application of my copending application, Ser. No. 614,736, filed Sept. 18, 1975, and entitled "A RIGID SEGMENTED BRAKE DISK", now abandoned.

BACKGROUND OF THE INVENTION

The present invention relates to segmented brake disks wherein the segments are fastened to each other in such a manner that a rigid disk is formed. More specifically, the segments are connected to each other such that the axial width of the entire disk is the same throughout.

Heretofore, in the field of brake disk applications such as in jet aircraft, both commercial and military comparable disks have generally been made as one continuous unit. Not only does such a construction tend to be expensive, but such brake disks are subject to high thermal-induced stresses as well as operational and shear bending stresses, and are subject to failure during operation.

Another type of disk construction utilizes segmented brake disks to avoid these problems. However, in many of the segmented disk constructions, link-induced stresses collectively contribute to potential failure. In others, such as the disclosure of French Pat. No. 1,500,824, the connection of the segments at points within the swept area of the brake disk creates enormous high stress difficulties. The swept area refers to the contact area between the stator and rotor. Specifically, the generation of temperatures as caused by friction during a braking operation expands the segments throughout their axial width and circumferential length, placing stress on the lugs or links connecting the segments. When the segments cool, shrinkage occurs also placing stress on the lugs or links. Repeated expansion, contraction, and stress eventually will force breakdown of the lug or link between the segments, loss of contact between the segment and the keyway drive key, and failure of the braking operation. French Pat. No. 1,500,824 also emphasizes the use of one lug to connect two segments. However, any radial acceleration would cause angular rotation about the lug serving as a pivot point. Repeated operation of the braking system will eventually mechanically break down the lugs, again aided by the excessive temperatures generated by friction during a braking operation.

Even the use of two lugs or rivets, if connecting the segments within the swept area of the disks, will not improve the performance of the braking system significantly. U.S. Pat. No. 3,731,769 does disclose a segmented disk having two rivet or clip points, but both points remain within the swept area of the disk maintaining the overall susceptibility to functional breakdown as caused by frictional heat build-up. Further, U.S. Pat. No. 3,731,769 employs a clip that extends outside the axial width of the segmented disk.

Additionally, U.S. Pat. No. 3,483,953 discloses a segmented disk brake structure which has a clip which engages the segments near the center of its periphery. Further, between the clip attachment points resides the keyway slot at the center of the periphery of each segment. As with French Pat. No. 1,500,824, any abrupt radial acceleration would cause angular rotational strain about the clip attachment points which is accentuated by the distance between the point of attachment and the edge of the segment.

Additionally, several constructions of segmented brake disks tend to be costly, require external clips, links or fasteners, and thus, contain additional complexity and are cumbersome with respect to ease of assembly, installation and replacement.

SUMMARY OF THE INVENTION

It is, therefore, an object of the present invention to provide a segmented brake disk which is easy to assemble and install in a brake disk stack.

It is another object of the present invention to provide a segmented brake disk, as above, which is circularly rigid.

It is a further object of the present invention to provide a segmented brake disk, as above, which has a constant axial width throughout.

It is another object of the present invention to provide a segmented brake disk, as above, wherein the segments are connected by a tongue extending from some of the segments and engage a recess located in some of the segments.

It is yet a further object of the present invention to provide a segmented brake disk, as above, wherein the tongue is located in one end portion and the recess is located in another end portion of a segment, and both are located in the periphery thereof.

It is yet another object of the present invention to provide a segmented brake disk, as above, wherein the tongue and recess are secured by at least two fastening members.

It is a further object of the present invention to provide a segmented brake disk, as above, wherein the tongue and recess areas are located at the periphery of the segments beyond the swept area of the disk segments.

It is another object of the present invention to provide a segmented brake disk, as above, wherein the tongue and recess connection is least exposed to high expansion and contraction stress, as is caused by the frictional heat build-up during a braking operation.

Yet another object of the present invention is to provide a segmented brake disk, as above, wherein the U-shaped groove is located at least closer to the end portion of the segment than are the tongue and recess points of attachment.

It is a further object of the present invention to provide a segmented brake disk, as above, wherein the position of the groove, located closer to the end portion of the segment than the tongue and recess points of attachment, minimizes angular rotational strain as is caused by the abrupt radial or circumferential acceleration of the segments forming the rigid segmented brake disk.

It is yet another object of the present invention to provide a segmented brake disk, as above, which retains a circular, rather than an elliptical configuration, when removed from its driving means and, thus, facilitates installation into a normally circular wheel, gear or pulley.

It is another object of the present invention to provide a circularly rigid segmented brake disk having a constant axial width throughout and in which the segments are connected by clips.

It is yet another object of the present invention to provide a segmented brake disk connected by a clip, as immediately above, in which the end portions of the segments have slots and wherein fastening members connect the clips to the segment slots.

It is yet another object of the present invention to provide a segmented brake disk connected by a clip, as above, in which the homogeneous segmented disk efficiently transfers heat from the surface to the core of the segment.

It is a further object of the present invention to provide a segmented brake disk connected by a clip, as above, wherein the clip and slot areas are located at the periphery of the segments beyond the swept area of the disk segments.

It is another object of the present invention to provide a segmented brake disk connected by a clip, as above, wherein the clip and slot connection is not subject to expansion and contraction stress, as is caused by the frictional heat build-up during a braking operation.

Yet another object of the present invention is to provide a segmented brake disk connected by a clip, as above, wherein the U-shaped groove is located at least closer to the end portion of the segment then are the clip and slot points of attachment.

It is a further object of the present invention to provide a segmented brake disk connected by a clip, as above, wherein the position of the groove, located closer to the end portion of the segment than the clip and slot points of attachment, minimizes angular rotational strain as is caused by abrupt radial or circumferential acceleration of the segments forming the rigid segmented brake disk.

These and other objects of the present invention are described in detail without attempting to discuss all of the various modifications in which the invention might be embodied; the invention being measured by the appended claims and not by the details of the specification.

In general, a segmented brake disk, comprises; a plurality of segments, a gap existing between said segments, said segments having two end portions, a periphery, and a width, said segments having a tongue and a swept area, said tongue having an axial width less than said segment width, said tongue extending from one of said segment end portions, said swept area having inherent high thermal expansion and contraction forces, a recess having an axial width less than said segment width, said recess located in said remaining segment end portions, said tongue residing in said recess, said tongue located at said periphery of one of said end portions substantially outside said swept area on said segment, said recess located at said periphery of said remaining end portion substantially outside said swept area on said segment, and at least two separate fastening means for securing each said tongue to each said segment end portion having said recess to form a rigid connection outside said swept area of said segment so that said connection is outside said thermal expansion and contraction forces.

Additionally, a segmented brake disk, comprises; a plurality of segments, said segments having two end portions, a periphery, and a width, a gap existing between said segments, each said segment end portion having a slot and a swept area, said slot located at said periphery of said end portion substantially outside said swept area on said segment, said slot having an axial width less than said segment width, said swept area having inherent thermal expansion and contraction forces, a clip, said clip having an axial width less than said segment width and residing in said slots, said groove portions are located at least closer to said segment end portion than the points which said fastener means secures said clip to said slot, and at least two separate fastening means for securing each said clip to said segment peripheral end portions having said slot to form a rigid connection outside said swept area of said segment so that said connection is outside said high thermal expansion and contraction forces.

DESCRIPTION OF THE DRAWINGS

FIG. 1 is a plan view of a segmented rotor brake disk.

FIG. 2 is an enlarged plan view of FIG. 1 showing a single segment having a tongue and a recess.

FIG. 3 is a plan view of the stator brake disk having wear pads thereon.

FIG. 4 is a top elevation view of a segment.

FIG. 5 is a cross-sectional view taken in line 5—5 of FIG. 1 showing the attachment of one segment to another.

FIG. 6 is a plan view showing a portion of a segmented brake disk utilizing a clip to connect the segments.

FIG. 7 is a cross-sectional view taken in line 6—6 of FIG. 6 showing the attachment of the clip to the segment.

DESCRIPTION OF THE PREFERRED EMBODIMENTS

The concepts of the present invention generally relate to a circularly rigid segmented brake disk having at least a tongue extending from some of the segments, at least a recess located in some of the segments, with the tongues connected to the segment recesses to generally form an annular rigid brake disk having good stability and facilitating wheel assembly. An individual segment may contain 0, 1, or a plurality of tongues and/or recesses and are arranged, of course, to form a rigid tongue-recessed connection which lies within the planes of the disk wear or frictional surfaces.

A preferred embodiment of the present invention is shown in FIG. 1, wherein the segmented brake disk is generally indicated by the numeral 10. The disk contains a plurality of segments 11, which are connected in such a manner that a gap 12 exists between the ends 13 thereof. The gap, of course, prevents deformation of the segments and disk, as a whole, due to the efects of heat build-up and cooling as well as from the resulting mechanical stresses encountered. That is, during a braking operation, all surfaces rubbed by linings experience a substantial heat build-up, which upon cooling, causes arcurate shrinkage in steel disks. Such shrinkage, when restrained as in a non-segmented disk, generates stresses of a magnitude to deform the initially flat disk into either a "Belleville" washer or a wave-washer configuration. This change of flatness is deleterious to proper brake operation and causes lost running clearance and, hence, dragging with resultant fires and disk failure.

Generally, but not necessarily, the periphery of segment 11 is arcual as in the tongue of the segments and, hence, the segments are generally referred to in the art as being arcual.

As best shown in FIG. 2, segment 11 has a tongue, generally indicated by the numeral 15, extending from one of the end portions 13. Additionally, a recess, generally indicated by the numeral 16, extends inward into the disk from the other end portion and has a shape corresponding to that of the tongue. Generally, the tongue has an arcual surface 17 which coincides with the periphery of the segment. Additionally, tongue 17 contains a portion of a U-shaped groove or keyway indicated by the numeral 18 which, along with a remaining portion 19 appearing on an adjacent segment of the U-shaped groove or keyway, constitutes a groove generally indicated by the numeral 20 for the acceptance of a keyway drive key, not shown. The tongue terminates in essentially a radial surface 21 and has an arcual or curvilinear portion 22 which gives way to essentially a linear, inwardly tapered surface 23. Generaly, the slope of tapered surface 23 is not important as long as a sufficient radial distance is maintained from U-shaped portion 18, as well as axial thickness, to provide sufficient structural integrity to the tongue and to prevent it from failing at this point.

Recess 16 contains a surface, generally indicated by the numeral 25. Recess surface 25 generally corresponds to the tongue surfaces, but extends sufficiently into the segment such that a small gap exists between the tongue and recess surface 25 to compensate for expansion of segments. Thus, recess surfaces 25 contains a radial surface 27 which extends radially inward into the segment, a curvilinear or arcual surface 28, and an inwardly tapered linear surface 29 which extends to an end portion of the segment opposite the tongue end portion.

Tongue 15 may exist on one axial side of the segment and reside in a recess 16 which exists in the same axial side of an adjacent segment; or, in any other variation wherein both the tongue and recess have an axial width less than said segment axial width, but in overall combined width equal to the segment width. In the preferred embodiment as best shown in FIG. 4, the tongue exists within the central axial portion of the segment as does recess 16. Additionally, as apparent from FIG. 2, preferably, the tongue and the recess exist at or near the periphery of the segment so that during operation, the engagement of a tongue 15 with a recess 16 is not subjected to frictional forces. This provision provides a relatively cool engagement between the tongue and recess portions and thereby eliminates the necessity of using very low stress allowables which are attendant with highly elevated temperatures. The cooler engagement between the tongue and recess portions 17 and 16 is a direct result of the position of the portions 17 and 16 substantially outside the swept area 91 on the segment 11 as shown in the drawings. Moreover, the points of attachment of tongue and recess portions 17 and 16 are completely outside the swept area 91 to minimize the high thermal expansion and contraction forces inherent to swept area 91. Temperatures in this periphery region are sufficiently cooler, because no friction is generated there outside the swept area and it is also exposed to air cooling. The lower temperature in the engagement region sufficiently increases the structural integrity of the entire segment 11. Any expansion and contraction of the segment 11 that might occur at the periphery may be attributed to the area 92 outside the radial limit of the swept area 91. Therefore, the tongue and recess portions 16 and 17 are located substantially outside the area affected by the high frictional heat gradient.

In general, a conventional fastening member is utilized to connect tongue 15 to recess walls 31, as best shown in FIG. 5. A desirable fastening member is simply a pin or rivet 32 which is deformed to reside within an outward taper or countersunk portion 33 existing in the axially outer portions or flanges of the segment as well as the aperature 33 in the tongue. In order that the connection between the tongue and recess results in a rigid connection, at least two points of connection are required such as two rivets. Of course, any other type of fastening methods may be utilized, such as spot welding or the like, and it is to be understood that, should a weld line exist, the line, of course, is made-up of a series of points and, thus, provides at least two separate points of connection or engagement.

The position of the groove 20 between the points of attachment of tongue 17 with recess 16 minimizes angular rotational strain as is caused by abrupt radial or circumferential acceleration of the segments 11, because the keyway drive key, not shown, engages the groove 20 formed by the groove portions 18 on both the tongue 17 and recess 16 at the same time. The engagement of the keyway drive key against the tongue 17 and the recess 16 groove portions 18, simultaneously eliminates any strain that would be placed on the fastening member 32 used to secure the tongue 17 an recess 16 if the groove 20 were located at any other point along the segment periphery. That is to say, the brake torque force during a braking operation, results in a force which applies equally and simultaneously to the groove portions 18 of both tongue 17 and recess 16. This structural configuration substantially reduces the angular rotational forces strain placed upon the fasteners 32.

The segments, including the tongue and the rivets may be made of conventional heatsink material such as metallics, for example, steel, a carbon composite material, and combinations thereof, as well understood by one skilled in the art. Furthermore, although in the preferred embodiment shown the segmented disk relates to a rotor which is utilized in a brake disk stack, not shown, the segmented disk according to the concepts of the present invention may also be utilized for a stator wherein, preferably, the tongue and recess connection exists near or around the inner radial surface.

A stator which may be utilized in connection with the segmented disk 10 is generally indicated by the numeral 40. The stator has U-shaped grooves or keyways 41 located on the inner radial surface, and, of course, receives keyway drive keys, not shown. Stator 40 may be made of the same materials as the rotor. In the embodiments shown, the stator is a continuous, annular disk and contains wear pads 42 thereon. These pads may be made of a conventional material such as sintermets, ceramets, organics, or the like, with the rotor being made from steel. Of course, wear pads of steel are not desired since they generally produce a low coefficient of friction, and produce gouges or grooves in adjacent disk surfaces. As shown in FIG. 3, the wear pads may be readily attached to a continuous stator as through rivets 43.

It is also within the scope of the present invention to provide tongue and recess engagements other than that shown in the preferred embodiment. For example, a particular segment may have a tongue located in each end portion and engage an adjacent segment which contains two correspondingly shaped recesses located in each end portion. Additionally, rather than a single tongue and recess connection on any one end portion of the adjacent segments, a plurality of such tongue and recess engagements may exist. Furthermore, the tongue portion and the recess may be shaped differently, so long as generally a sufficient radial length exists to provide sufficient structural integrity to prevent cracking or shearing of the tongue. Of course, combinations of these various embodiments may also exist.

As previously noted, the segmented brake disk may be made out of any suitable heatsink material such as steel or a carbon-based material. Should a carbon-based material be utilized, it preferably is a carbon composite material or a laminated structure made from a carbon-based material and layers of fiber in accordance with well known conventional practice. Desirably, the carbon-based material may be coal tar pitch, petroleum pitch, furan resins, polyacrylonitrile, and mixtures thereof, as well as any other materials which have a high coking value and can be pyrolyzed to yield essentially a carbon material. By a high coking value is meant, the material which, upon pyrolization, will yield at least 30 percent of its initial weight as carbon and preferably at least 50 percent. The fiber layer which also may be made according to any conventional practice and exists as carbon cloth may be a fibered layer containing materials known to the art which may be pyrolyzed to a carbon cloth. Specific examples include rayon, polyacrylonitrile fiber, combinations thereof, and the like. In general, the carbon composite layer is made by repeatedly impregnating the fiber layer with the carbon-based material and heating to pyrolyze the base material to essentially carbon. After repeated operations, a carbon composite article is produced.

Although the tongue portions of the various segments may be connected by carbon plugs, principally, metal rivets are preferred in accordance with conventional practice. Therefore, bushing may be utilized to engage the bore or aperture of the tongue and the recessed side walls to prevent wear, with the rivet, of course, being located within the bushing.

In another embodiment of the present invention, a segmented brake disk which may be utilized such as, preferably, a rotor, or less desirably, as a stator, may be made of the same material as in the embodiment set forth in FIG. 1, in this embodiment. The end portions of the segments having a slot and a clip engages the slots and is secured thereto by a fastening member to form a rigid brake disk.

Referring to FIG. 6, a portion of a segmented brake disk is generally indicated by the numeral 50 and has segments 51 separated by a gap 52. The segments which are generally arcual are connected through their end portions 55 to form an annular brake disk. Preferably, a slot generally indicated by the numeral 56 resides within the end portions at or near the periphery of each segment. A particular and preferred slot is shown in FIG. 6. Generally, the slot comprises a radial surface 57, a curvilinear or arcual portion 58, and an inwardly tapered linear portion 59 which extends to end portion 55. As shown in FIG. 7, slot 56 is preferably located in the axial central portion of the disk although, of course, other axial locations may be utilized. Additionally, the slot may have various different shapes and configurations. Thus, the clip and slot have an axial width less than the segment axial width, but the overall combined width of the clip and slot is equal to the segment axial width.

A keyway groove 65 generally exists in the peripheral vicinity of end portions 55 between the segments as shown in FIG. 6. Of course, if the particular disk involved was a stator in accordance with conventional practice, the keyway grooves may be located on the internal diameter of a disk.

The clips which join the segments are generally indicated by the numeral 70 and, preferably but not necessarily, made of the same material as the segments. Generally, clip 70 has the same shape or configuration as slot 56 except that it is of a slightly smaller size such that a slight gap 71 exists between the clips 70 and the slot 56 for ease of assembly, and to compensate for expansion of the segments. Thus, in the preferred embodiment depicted in FIG. 6, clip 70 has a radial surface 73, a curvilinear or arcual surface 74, and an inwardly tapered linear surface 75 which generally extends into gap 52 between the segments and then abruptly is tapered outwardly in a linear manner with the remaining portion of the clip generally being a mirror image or symmetrical with respect to the just-described portion. In an alternative embodiment, surface 75 may be linear and perpendicular with respect to a radii passing through gap 52 or it may be arcual. In any event, it contains a groove 77 which is similar to keyway groove 65. In general, keyway groove 65 is U-shaped and is of the same breadth or size as slot 56 so that it engages a keyway drive, not shown.

Clips 70 are connected to segments 51 through any conventional fastening member as well known to those skilled in the art. In the preferred embodiment, the connecting or fastening member is a rivet 78 which resides with an aperture 79 of the segment and aperture 80 of the clip as shown in FIG. 7. Desirably, the apertures within the segment may be tapered axially outward, as shown, to provide a countersink effect. In order that the brake disk be rigid, each segment contains at least two connection points as in the embodiment of FIGS. 1 through 5.

The position of the keyway groove 65 in relation to the points of attachment between the clips 70 and segments 51 is as crucial for this embodiment as the embodiment represented in FIGS. 1 through 5, for the fastening member 78 could be subjected to annular rotational strain, as is caused by abrupt radial and circumferential acceleration during a braking operation, if the keyway groove 65 were positioned elsewhere. Further, the position of the clip and recess portions substantially outside the swept area 91 and within area 92 of the segments 51 eliminates the effects of frictional heat gradients on the point of attachment, resulting in the same structural advantages as that described in the embodiment noted in FIGS. 1 through 5.

A brake disk made according to the construction shown in FIGS. 6 and 7, as well as with the construction set forth in FIGS. 1 through 5, contains connected segments such that the axial width of the entire disk is preferably the same throughout. Moreover, the disk set forth in FIGS. 6 and 7 may be used in association with the stator as shown in FIG. 3 in a brake disk stack, such as those conventionally utilized in jet aircraft.

It is also within the scope of the present invention to provide a clip and slot engagement other than that shown in the preferred embodiment. For example, the particular segment may have a clip located at other portions along end portions 55. Additionally, rather than a single clip and slot, a plurality of clips and slots may exist. Moreover, the configuration of the clips and slots may vary generally so long as the clip has a sufficient radial length and axial thickness to provide sufficient structural integrity and thereby prevent failure of the clip during operation of the brake disk.

While in accordance with the patent statutes, the preferred embodiments of the invention have been illustrated and described in detail, it is to be particularly understood that the invention is not limited thereto; the invention being limited solely by the scope of the appended claims.

What is claimed is:

1. A segmented brake disk, comprising;
   a plurality of segments, a gap existing between said segments,
   said segments having two end portions, a periphery, and a width,
   said segments having a tongue and a swept area,
   said tongue having an axial width less than said segment width, said tongue extending from one of said segment end portions,
   said swept area having inherent high thermal expansion and contraction forces,
   a recess having an axial width less than said segment width, said recess located in said remaining segment end portions,
   said tongue residing in said recess,
   said tongue located at said periphery of one of said end portions substantially outside said swept area on said segment,
   said recess located at said periphery of said remaining end portion substantially outside said swept area on said segment, and
   at least two separate fastening means for securing each said tongue to each said segment end portion having said recess to form a rigid connection substantially outside said swept area of said segment so that said connection is outside said high thermal expansion and contraction forces.

2. A segmented brake disk according to claim 1, wherein the shape of said recess corresponds to the shape of said tongue.

3. A segmented brake disk according to claim 1, wherein said disk is made from metal.

4. A segmented brake disk according to claim 1, wherein said disk is made from a carbon composite material.

5. A segmented brake disk according to claim 1, wherein said carbon composite material is made from a laminate of a carbon-based material and a carbon cloth.

6. A segmented brake disk according to claim 5, wherein said carbon-based material is pyrolized coal tar pitch.

7. A segmented brake disk according to claim 1, wherein said disk is a rotor.

8. A segmented brake disk according to claim 1, wherein said gap between said segments is formed by the combination of said segments having groove portions on each end portion.

9. A segmented brake disk according to claim 8, wherein said groove portions are located at least closer to said segment end portion than the points where said fastening means secures said tongue to said recess.

10. A segmented brake disk according to claim 8, wherein the shape of said recess corresponds to the shape of said tongue.

11. A segmented brake disk according to claim 8, wherein said tongue is located in the central axial portion of said segment and said groove is located in the central axial portion of said segment.

12. A segmented brake disk according to claim 9, wherein said fastening means are rivets or spot welds.

13. A segmented brake disk according to claim 1, wherein said tongue has a radial surface, a curvilinear portion and an inwardly tapered surface,
    said tongue radial surface being contiguous with said curvilinear portion and said curvilinear portion being contiguous with said inwardly tapered surface,
    said recess having a radial portion, a curvilinear portion, and an inwardly tapered surface,
    said recess radial surface being contiguous with said curvilinear portion and said curvilinear portion being contiguous with said inwardly tapered surface, and
    at least two separate fastening means for securing each said tongue to each said segment end portion having said recess to form a rigid segmented brake disk.

14. A segmented brake disk, comprising;
    a plurality of segments, said segments having two end portions, a periphery, and a width, each said end portion having a groove portion,
    a gap existing between said segments,
    each said segment end portion having a slot, an axial width, and a swepth area,
    said slot located at said periphery of and entirely within said axial width of said end portion substantially outside said swept area on said segment,
    said slot having an axial width less than and entirely within said segment width, and having a radial height,
    said swept area having inherent thermal expansion and contraction forces,
    a clip, said clip having a radial height and having an axial width less than said segment width, said clip having one end residing in one said slot, and the other end residing in said slot on an adjacent said segment,
    at least two separate fastening means for securing each end of each said clip to said segment peripheral end portions having one said slot to form a rigid connection outside said swept area of said segment so that said connection is substantially outside said thermal expansion and contraction forces, and
    said groove portions being located at least closer to said segment end portion than the points where said fastening means secures said clip to said slot.

15. A segmented brake disk according to claim 14, wherein the shape of said slot corresponds to the shape of said clip and said end portions have an expansion and assemblage clearance between said slot radial height and said clip radial height.

16. A segmented brake disk according to claim 14, wherein said disk is made from metal.

17. A segmented brake disk according to claim 14, wherein said disk is made from a carbon composite material.

18. A segmented brake disk according to claim 17, wherein said carbon composite material is a laminate of a carbon-based material and a carbon cloth.

19. A segmented brake disk according to claim 18, wherein said carbon-based material is pyrolized coal tar pitch.

20. A segmented brake disk according to claim 14, wherein said disk is a rotor.

21. A segmented brake disk according to claim 14, wherein said gap between said segments is formed by the combination of said segments having groove portions on each end portion.

22. A segmented brake disk according to claim 14, wherein the shape of said slot corresponds to the shape of said clip.

23. A segmented brake disk according to claim 14, including a central axial portion of said segment wherein said slot is located in said central axial portion of said segment and said clip is located in said central axial portion of said segments.

24. A segmented brake disk according to claim 23, wherein said fastening means are rivets or spot welds.

25. A segmented brake disk according to claim 14, wherein said clip has a radial surface, a curvilinear portion and an inwardly tapered surface, said clip radial surface being contiguous with said curvilinear portion and said curvilinear portion being contiguous with said inwardly tapered surface, said slot having a radial portion, a curvilinear portion, and an inwardly tapered surface, said slot radial surface being contiguous with said curvilinear portion and said curvilinear portion being contiguous with said inwardly tapered surface, and at least two separate fastening means for securing each said clip to each said segment end portion having said slot to form a rigid segmented brake disk.

26. A segmented brake disk according to claim 1, wherein said carbon-based material is pyrolized petroleum pitch.

27. A segmented brake disk according to claim 1, wherein said carbon-based material is pyrolized polyacrylonitrile.

28. A segmented brake disk according to claim 1, wherein said carbon-based material is pyrolized furan resin.

29. A segmented brake disk according to claim 18, wherein said carbon-based material is pyrolized petroleum pitch.

30. A segmented brake disk according to claim 18, wherein said carbon-based material is pyrolized polyacrylonitrile.

31. A segmented brake disk according to claim 18, wherein said carbon-based material is pyrolized furan resin.

* * * * *